United States Patent [19]

Wada et al.

[11] 4,066,540
[45] Jan. 3, 1978

[54] APPARATUS AND METHOD FOR CONTINUOUS FROTH FLOTATION

[75] Inventors: Shinji Wada; Yoshiaki Matsunaga, both of Tokyo; Michihiro Noda, Zushi, all of Japan

[73] Assignee: Agency of Industrial Science & Technology, Tokyo, Japan

[21] Appl. No.: 736,341

[22] Filed: Oct. 28, 1976

Related U.S. Application Data

[63] Continuation of Ser. No. 612,494, Sept. 11, 1975, abandoned.

[30] Foreign Application Priority Data

Sept. 12, 1974 Japan .............................. 49-105156

[51] Int. Cl.[2] .......................... B03D 1/02; B03D 1/24
[52] U.S. Cl. .................................. 210/44; 210/221 P; 261/113

[58] Field of Search ................... 23/270.5 T; 55/178, 55/186, 187, 55; 202/158, 234; 209/168, 169, 170; 210/44, 150, 151, 221 M, 221 P; 261/113, 123

[56] References Cited

U.S. PATENT DOCUMENTS

| 2,041,059 | 5/1936 | French ................................. 55/55 X |
| 2,560,978 | 7/1951 | Persson et al. ................... 261/113 X |
| 2,662,001 | 12/1953 | Burns et al. ....................... 261/113 X |
| 2,678,199 | 5/1954 | Koch ................................. 202/158 X |
| 3,665,677 | 5/1972 | Koch ................................. 261/113 X |

Primary Examiner—Wilbur L. Bascomb, Jr.
Assistant Examiner—Robert H. Spitzer
Attorney, Agent, or Firm—Kurt Kelman

[57] ABSTRACT

An apparatus for continuous froth flotation is disclosed which comprises a vertically elongate column having disposed therein a froth separator, a raw water inlet pipe, a treated water discharge pipe and a gas dispersing unit, and stepped shelves disposed inside said column and adapted to provide thorough contact between the bubbles and the water subjected to treatment.

6 Claims, 1 Drawing Figure

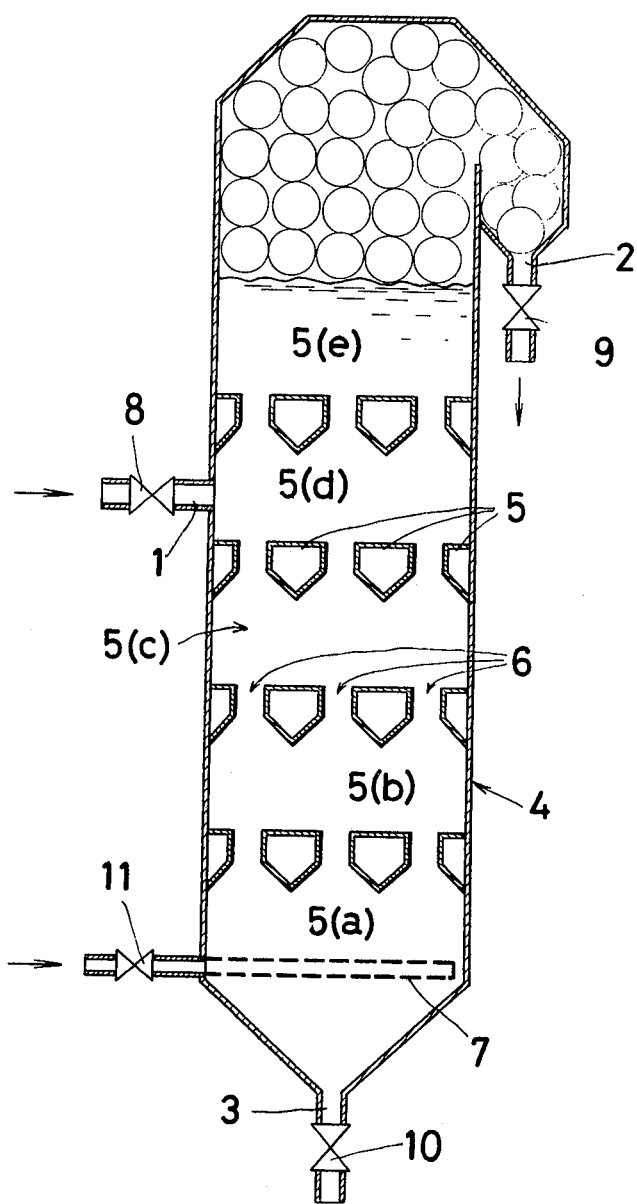

APPARATUS AND METHOD FOR CONTINUOUS FROTH FLOTATION

This is a continuation of application Ser. No. 612,494, filed Sept. 11, 1975, now abandoned.

BACKGROUND OF THE INVENTION

This invention relates to removal of suspended substances, surface active substances, heavy metals, etc. from waste water containing said extraneous substances, said removal being effected by forming bubbles in said waste water and thereby causing said extraneous substances to be deposited on said bubbles by virtue of adsorption or adhesion. More particularly, this invention relates to an apparatus and method for continuous froth flotation, whereby said removal of extraneous substances is effected with enhanced efficiency.

In recent years, pollution due to the industrial waste has come to pose a serious social problem. In particular, suspended substances, surface active substances, heavy metals and the like contained in waste water present serious problems. Thus, need is felt for research directed to the development of techniques for the separation and concentration of suspended substances and surface active substances contained in waste water and techniques for the removal of heavy metals also contained in the waste water. In addition, further improvement are required in the existing techniques employed for the separation and concentration of metals contained in sea water as one aspect of ocean development and techniques employed for the separation and concentration of substances mixed or dissolved in minute amounts in solutions. As means capable of fulfilling these requirements, the flotation method and the foam separation method which accomplish desired concentration and separation of suspended substances and surface active substances by utilizing said substances' ability to form stable froth and the ion flotation method which accomplishes desired concentration of substances devoid of surface activity by imparting surface activity thereto and thereby forming froth therein are drawing much interest because of the simplicity of the construction of the apparatus adapted to effect these methods and the conspicuousness of the effect of treatment attained.

The apparatus of this sort which have to date been put to actual use for the flotation are invariably of a simple construction composed of a tank which is provided at the lower portion thereof with a gas dispersing unit designed to form bubbles. Improvements have merely been given to the shape of said tank, to the positions at which the froth outlet, the raw water feed inlet, the treated water outlet, etc. are attached, to the type and shape of said gas dispersing unit, to the number of gas dispersing units to be installed, and so on. In these apparatus, the entire volume of the liquid contained in the tank is evenly agitated by the upward current of bubbles and the consequent phenomenon of air lift and the liquid under treatment is caused to flow in a downward current via the shortest path. Thus, almost no concentration gradient is recognized to exist from the upper through lower portions of the tank interior. This is equivalent to saying that the entire volume of the liquid under treatment is not brought into sufficiently uniform contact with the bubbles and the effect of separation, therefore, is deficient. When the effect of separation reaches a certain degree, it always levels off and cannot be brought to a satisfactory level. Where better effect of separation is desired, therefore, the same treatment must be repeated a plurality of times by using a plurality of similar apparatus.

These known techniques have been disclosed by in British Pat. Nos. 955,321, 1,062,346 and 1,074,945 and U.S. Pat. Nos. 3,032,199 and 3,203,893, for example.

An object of the present invention is to provide an apparatus and method for continuous froth flotation which overcomes the aforementioned disadvantages suffered by the conventional apparatus and effects the flotation and separation of froth with extremely high efficiency.

BRIEF SUMMARY OF THE INVENTION

To accomplish the object described above, the apparatus for continuous froth flotation according to the present invention is provided inside a vertically elongate column with a plurality of vertically spaced shelves dividing the interior of the column into a plurality of vertically offset zones. Each shelf defines a plurality of unobstructed passages each consisting of an upper part of fixed width and a lower part contiguous with the upper part, flaring outwardly and inclined by an angle of at least 3° to the horizontal, the passages interconnecting two of the offset zones adjacent each shelf. Respective ones of the unobstructed passages are vertically aligned to define continuous vertical spaces extending from a head portion to the bottom of the interior of the column, and the total area occupied by the unobstructed passages in each shelf is no less than 3% and no more than 30% of the total cross-sectional area of the column. Besides these shelves, the column is provided with a froth separator disposed at the head of the column, with a raw water inlet pipe opening onto an upper one of the zones, a treated water outlet pipe disposed on the bottom of the column and a gas dispersing pipe disposed below the lowermost of said shelves.

Specific constructions which the shelves may assume include one in which each of the shelves consists of a plurality of horizontally elongated boxes each having two of its sides arranged relatively so that their respective confronting lateral edges adjoin each other in the shape of the letter "V," and one in which each of the stepped shelves consists of a plurality of mutually spaced blocks of a shape such that the upper half portion forms a hexahedron and the lower half portion an inverted pyramid.

BRIEF EXPLANATION OF THE DRAWING

The single FIGURE illustrates a longitudinal section of one preferred embodiment of the apparatus according to the present invention.

DETAILED DESCRIPTION OF THE INVENTION

The shelves are vertically spaced inside vertically elongated column 4 and divide the interior of the column into a plurality of vertically offset zones $5(a)$, $5(b)$, $5(c)$, $5(d)$ and $5(e)$, and the column is provided in the upper portion thereof with a raw water inlet pipe 1 adapted to admit a flow of raw water and opening onto an upper zone $5(d)$, at the head portion thereof with a froth separator 2 adapted to separate and discharge the froth and at the bottom portion thereof with a treated water outlet pipe 3 adapted to discharge the treated water. In the illustrated embodiment.

Each shelf consists of a plurality of horizontally elongate boxes 5 each having two of its sides arranged relatively so that their respective confronting lateral edges adjoin each other in the shape of the letter "V".

Where the shelves have the construction just described, it is desirable to additionally dispose boxes formed with one upwardly inclined side and having the other side thereof joined to the wall of column.

In another modification each of the stepped shelves consists of a plurality of mutually spaced blocks each of a shape such that the upper half portion forms a hexahedron and the lower half portion form an inverted pyramid.

In the illustrated embodiment, since there are a total of four shelves, the interior of the column is divided thereby into five treating zones $5(a)$, $5(b)$, $5(c)$, $5(d)$ and $5(e)$ as enumerated upwardly. Each shelf defines a plurality of unobstructed passages 6, respective ones of the passages being vertically aligned to define continuous vertical spaces extending from the head portion to the bottom of the interior of the column.

At the bottom portion of the column is disposed a gas dispersing unit 7. Numerals 8, 9, 10 and 11 denote flow-volume regulating valves disposed respectively in said raw water inlet pipe 1, in said froth separation unit 2, in said treated water outlet pipe 3 and in a gas dispersing unit 7.

In the apparatus of the present invention as a raw water to be treated such as, for example, a water containing suspended substances and surface active substances is introduced via the raw water inlet pipe 1 and, at the same time, air is delivered via the gas dispersing unit 7. Consequently, the raw water is first retained in the uppermost treating zone $5(e)$ to be exposed to contact with the froth ascending through the shaft of empty space 6. In consequence of this contact, the suspended substances and surface active substances contained in the raw water are deposited on the bubbles by virtue of adhesion and adsorption. The raw water descends through the shaft of unobstructed passages 6. During the downward travel through this shaft of unobstructed passages 6, the raw water is brought into counterflow contact with a great number of bubbles, with the result that the suspended substances and surface active substances are transferred and deposited in an increasingly larger amount onto the bubbles. Then, the raw water reaches the next lower treating zone $5(d)$, wherein it is retained and exposed to the ascending bubbles to be stripped of still remaining suspended substances and surface active substances by adhesion and adsorption to the bubbles.

Thereafter, the raw water descends to the successively lower treating zones $5(c)$, $5(b)$ and $5(a)$ while exposing itself to counterflow contact with the ascending flow of bubbles, with the remaining suspended substances and surface active substances deposited on the bubbles by virtue of adhesion and adsorption.

Consequently in the lowermost treating zone $5(a)$, the raw water is subjected to a finishing removal of suspended substances and surface active substances and is discharged in the form of a clear water via the treated water outlet pipe 3. Above the uppermost treating zone $5(e)$, the bubbles which have suspended substances and surface active substances deposited thereon by adhesion and adsorption collect in a layer. The froth is continuously released out of the column by means of the froth separator 2.

The froth separator 2 may be of a type having an open top or of a type using a completely closed chamber, as illustrated.

The treated water outlet pipe 3 may be disposed along the vertical side of the column so as to open into the ambient air at a relatively high level or it may simply be formed so as to open at the bottom of the column as in the embodiment of FIG. 2. Choice between these two types of pipes is made through overall evaluation of various factors such as the place available for installation of the apparatus, the purpose for which the apparatus is used, the shape and other conditions of the apparatus.

The apparatus of the present invention has the construction described above. Because of its simple construction, the apparatus is easy to fabricate.

The materials which can be used to make this apparatus include wood, metals, plastics, etc. To preclude possible adhesion of bubbles, the portions of the apparatus which are exposed to contact with the bubbles whould be made of a hydrophilic material.

For effective use in the apparatus of the present invention, the column may be in a cylindrical form, a prismatic form or other suitable form.

As concerns the shape of the shelves, those in which the individual shelves have their lower half sections in the shapes of an inverted pyramid, a hemisphere, a hemiellipsoid, an inverted cone, etc. are embraced by the present invention in addition to those already described.

The lower face of each of the shelves is required to be inclined by an angle of at least 3 degrees with reference to the horizon. For the purpose of smoothening the upward flow of bubbles and preventing the individual bubbles from merging into a larger mass, however, this angle of inclination should exceed 10 degrees. The angle of inclination should not be too large, for a sharply inclined lower face permits the froth to ascend at a rate too high for the raw water to be treated sufficiently.

The communicating zone, namely the shaft of open space, is where the bubbles are allowed to ascend and the raw water is caused to descend so that they will come into counterflow contact with each other. For this purpose, therefore, this zone is required to have a cross section not more than about 30% and not less than 3% of the cross section of the column.

In the case of a raw water which contains suspended substances, desired separation of such substances can be accomplished with added efficiency by having a coagulant or sequestrant incorporated in the raw water.

Where a given raw water contains ions and it is to be deprived of such ions, removal of the ions can efficiently be accomplished by adding to the raw material an ample amount of an ionic surface active agent the ionic sign of which is opposite that of the electric charge of the ions being removed.

The gas to be introduced into the gas dispersing unit is not specifically limited in kind; nitrogen gas, oxygen gas, hydrogen gas, carbon dioxide gas, etc. may be used besides air.

In the apparatus according to the present invention, the column interior is divided by the interposed shelves into a plurality of treating zones. In each of such treating zones, the raw water is retained and brought into ample contact with the bubbles so that transfer of suspended substances, surface active substances and even ions contained in the raw water, through adhesion or adsorption, to the froth proceeds sufficiently. Furthermore, since the bubbles are also allowed to ascend smoothly along the inclined plate of each of the shelves, possible merging of individual bubbles into a larger mass can be effectively prevented. The bubbles, therefore, are brought into intimate contact with the descending raw water in the communicating zone, with the result that the transfer, through the phenomenon on adhesion and adsorption, to the froth of said suspended substances, etc. contained in the raw water proceeds to a further extent.

As the raw water descends successively from the upper to lower treating zones, the concenrations of suspended substances and surface active substances contained therein are gradually lowered, enhancing the effect of separation to a great extent. The apparatus is compact and the effect is remarkable.

If the shelves are made of perforated flat plates or of inclined plates containing dents capable of retaining the bubbles, there is entailed a phenomenon whereby the individual bubbles merge into a larger mass. Consequently, the area of interface between the bubbles and the liquid decreases. Moreover, smooth ascent of the bubbles is impeded. Such stepped shelves, therefore, fail to produce the effect achievable by those of the apparatus of the present invention.

According to the apparatus of the present invention, suspended substances, surface active substances, dissolved ions, etc., which are contained in the raw water can be removed with extremely high efficiency.

Operating as described above, the present invention provides effective means for disposal of pollutated liquids, for concentration of trace elements contained in sea water, for separation of trace elements dissolved in solutions, and so on. It can accomplish such separation and concentration with much greater economy than possible by known techniques. Thus, the commercial value of the present invention is enormous.

Now the effect of the apparatus of this invention will be demonstrated with a working example.

EXAMPLE

As a preferred embodiment of the present invention, an apparatus having the basic construction illustrated was used. The column was of a square cross section and each shelf was formed of five boxes. The total area of the free space of each shelf was equal to 10% of the cross-sectional area of the column. A total of eight shelves were disposed at equal intervals, dividing the interior of the column into a total of nine treating zones.

As a control, there was used a column of a square cross section having the same height and volume. This column was identical in construction with the aforementioned apparatus of this invention, except that it was devoid of such shelves.

To the appartus of the present invention and to the control apparatus, air was introduced in a dispersed state and at the same time a raw water containing 20 ppm of polyoxyethylene nonylphenyl ether (HLB 14.4) (P.N.E.) was fed under the same conditions. The treated water from the control apparatus was found to contain about 5 ppm of the P.N.E. In contrast, the concentration of the P.N.E. in the raw water fell gradually to 8.8 ppm, 6.6 ppm, 5.0 ppm, 4.2 ppm, 2.7 ppm, 1.6 ppm, 1.2 ppm, 0.7 ppm and 0.4 ppm as the water passed to successively lower treating zones, indicating that the concentration of P.N.E. in the water decreased as the water descended along the column interior. The P.N.E. concentration in the finally discharged treated water was less than 0.4 ppm. Comparison shows that the concentration of the P.N.E. in the treated water from the apparatus of this invention was less than one-tenth of that in the treated water from the control apparatus.

What is claimed is:

1. An apparatus for the continuous flotation and separation of froth by forcing gas bubbles into counter-current contact with a liquid, comprising
   1. a vertically elongate column,
   2. a plurality of shelves vertically spaced in said column and dividing the interior of said column into a plurality of vertically offset zones,
      a. said shelves each defining a plurality of unobstructed passages, each passage consisting of an upper part of fixed width and a lower part contiguous with said upper part, flaring outwardly and defined by faces inclined by an angle of at least 3° with reference to the horizontal, the passages constituting the only interconnection between two of the offset zones adjacent each shelf,
      b. respective ones of said unobstructed passages in the plurality of shelves being vertically aligned to define continuous vertical spaces extending from a head portion to the bottom of the interior of the column, and
      c. the total area occupied by said unobstructed passages in each of said shelves being no less than 3 percent and no more than 30 percent of the total cross-sectional area of the column,
   3. a froth separator disposed in the head portion of the column,
   4. a raw water inlet pipe opening onto an upper one of the zones,
   5. a treated water outlet pipe disposed at the bottom of the column, and
   6. a gas dispersing unit disposed below a lowermost one of said shelves.

2. The apparatus according to claim 1, wherein the vertically elongate column is rectangular in horizontal cross section, the shelves are each comprised of at least three parallel, spaced oblong boxes which are V-shaped in vertical cross section at the bottom thereof, and the unobstructed passages are defined by the spaces between said oblong boxes.

3. The apparatus according to claim 2, wherein the vertical elongate column is square in horizontal cross section, the shelves are each comprised of at least three parallel, spaced oblong boxes which are V-shaped in vertical cross section at the bottom thereof, and the unobstructed passages are defined by the spaces between said oblong boxes.

4. The apparatus according to claim 1, wherein the vertically oblong column is circular in horizontal cross section and the shelves each define at least three circular unobstructed passages.

5. The apparatus according to claim 4, wherein the shelves are each formed of a circular plate containing at least three circular openings each having one of said unobstructed passages rising therefrom.

6. A method for the treatment of raw water by use of an apparatus for the continuous flotation and separation of froth comprising
   1. a vertically elongate column,
   2. a plurality of shelves vertically spaced in said column and dividing the interior of said column into a plurality of vertically offset zones,
      a. said shelves each defining a plurality of unobstructed passages, each passage consisting of an upper part of fixed width and a lower part contiguous with said upper part, flaring outwardly and defined by faces inclined by an angle of at least 3° with reference to the horizontal, the passages constituting the only interconnection between two of the offset zones adjacent each shelf,
   b. respective ones of said unobstructed passages in the plurality of shelves being vertically aligned to define continuous vertical spaces extending from a head portion to the bottom of the interior of the column, and
   c. the total area occupied by said unobstructed passages in each of said shelves being no less than 3 percent and no more than 30 percent of the total cross-sectional area of the column,
3. a froth separator disposed in the head portion of the column,
4. a raw water inlet pipe opening on an upper one of the zones,
5. a treated water outlet pipe disposed at the bottom of the column, and
6. a gas dispersing unit disposed below a lowermost one of said shelves, which method comprises the steps of continuously introducing the raw water subjected to treatment into said vertically elongate column through the raw water inlet pipe and continuously feeding air under pressure into said column through the gas dispersing unit, whereby the raw water continuously descending through the unobstructed passages in the successively lower shelves and the air continuously ascending in the form of bubbles through the unobstructed passages in the successively higher shelves come into countercurrent contact with each other so that substances contained in the raw water are now deposited on or adsorbed on said bubbles, and the bubbles on which the substancees formerly contained in the raw water are now deposited or adsorbed are discharged to the froth separator and the water which has been stripped of said substances is discharged through the treated water outlet pipe.

* * * * *